(12) United States Patent
Biedenkopf

(10) Patent No.: US 7,282,280 B2
(45) Date of Patent: Oct. 16, 2007

(54) METHOD FOR PRODUCING A MELT CARBONATE-FUEL CELL AND TO MELT CARBONATE FUEL CELLS

(75) Inventor: Peter Biedenkopf, Kirchseeon (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 637 days.

(21) Appl. No.: 10/380,376

(22) PCT Filed: Sep. 14, 2001

(86) PCT No.: PCT/EP01/10646

§ 371 (c)(1),
(2), (4) Date: Jul. 23, 2003

(87) PCT Pub. No.: WO02/23648

PCT Pub. Date: Mar. 21, 2002

(65) Prior Publication Data

US 2004/0043284 A1   Mar. 4, 2004

(30) Foreign Application Priority Data

Sep. 16, 2000   (DE) ................... 100 45 912

(51) Int. Cl.
*H01M 8/00* (2006.01)
*H01M 4/00* (2006.01)
(52) U.S. Cl. ............... 429/12; 429/40; 429/44; 429/45
(58) Field of Classification Search ........... 429/12, 429/40, 44, 45
See application file for complete search history.

(56) References Cited

U.S. PATENT DOCUMENTS 4,554,225 A * 11/1985 Sounai et al. ........... 429/34
5,582,624 A    12/1996 Jantsch et al.
5,795,671 A *  8/1998 Nirasawa et al. ........ 429/41
6,063,141 A *  5/2000 Wendt et al. ........... 29/623.1

FOREIGN PATENT DOCUMENTS

| DE | 4235514   | 4/1994 |
| DE | 4241266   | 7/1994 |
| DE | 4434586   | 4/1996 |
| DE | 19731772  | 1/1998 |
| DK | 9501082   | 3/1997 |
| EP | 0327887   | 8/1989 |
| JP | 63138665  | 6/1988 |

OTHER PUBLICATIONS

H. Wendt, et al., "Materials Problems and Fabrication Technologies of Molten Carbonate Fuel Cell Anodes" Extended Abstracts, Electrochemical Society, Princeton, New Jersey, vol. 93, No. 1, 1993, pp. 1558-1559.
International Search Report.

* cited by examiner

*Primary Examiner*—Dah-Wei Yuan
(74) *Attorney, Agent, or Firm*—Crowell & Moring LLP

(57) ABSTRACT

The invention relates to a method for producing a melt carbonate fuel cell comprising a cathode layer made from porous nickel oxide, an anode layer made from porous nickel and a melt arranged between the cathode layer and the anode layer, received in the form of a finely porous electrolyte matrix melt consisting of one or more alkali metal carbonates as electrolytes. In order to produce the cathode layer, a sintered, coated electrode path, coated with catalytically activating particles, made of porous nickel in the fuel cell operation mode is reacted to form nickel oxide. According to the invention, the electrode path is coated with catalytic activating particles made from one or more nonoxidic inorganic metal compounds, which are reacted to form the corresponding metal oxides under gas development. The invention relates to another similar fuel cell with increased activation of the cathode reaction.

Figure 1:

6 Claims, 1 Drawing Sheet

METHOD FOR PRODUCING A MELT CARBONATE-FUEL CELL AND TO MELT CARBONATE FUEL CELLS

The invention relates to a method for producing a molten carbonate fuel cell as well as to a molten carbonate fuel cell.

Fuel cells are devices in which a chemical reaction takes place between a gas and an electrolyte. In principle, in the reverse of the electrolysis of water, a hydrogen-containing fuel is brought up to an anode and an oxygen-containing cathode gas is brought up to a cathode and converted to water. The energy released is removed as electrical energy.

Molten carbonate fuel cells (MCFC) are described, for example, in DE 43 03 136 C1 and DE 195 15 457 C1. In their electrochemically active region, they consist of an anode, an electrolyte matrix and a cathode. As electrolyte, a melt of one or more alkali metal carbonates is used, which is placed in a finely porous electrolyte matrix. The electrolyte separates the anode from the cathode and seals the gas spaces of the anode and cathode from one another. During the operation of a molten carbonate fuel cell, a gas mixture, containing oxygen and carbon dioxide, generally air and carbon dioxide, is supplied to the cathode. The oxygen is reduced and the carbon dioxide is converted to carbonate ions, which migrate into the electrolyte. Hydrogen-containing fuel gas is supplied to the anode, the hydrogen being oxidized and converted with the carbonate ions from the melt into water and carbon dioxide. The carbon dioxide is recycled to the cathode. The oxidation of the fuel and the reduction of the oxygen take place separately from one another. The operating temperature is between 550° and 750° C. MCFC cells transform the chemical energy, stored in the fuel, directly and efficiently into electrical energy.

A generic method for producing such a molten carbonate fuel cell is described in the DE 43 03136 C1. Usually, a slurry of nickel powder of a particular particle size and various auxiliary materials is prepared, pulled out into an electrode web or sheet and dried. The electrode web is formed into serviceable electrode material in that it is heated, freed from organic components and sintered. The resulting, sintered, porous nickel web is incorporated in fuel cells. The fuel cell is heated to its operating temperature, a cathode layer of nickel oxide being formed by the action of the molten electrolyte. Since the electrolyte generally contains lithium, the nickel oxide layer is doped with lithium oxide (lithiated). During the operation of the cell, there is a thin electrolyte film on the surface of the cathode material, in which the transport and the chemical reactions of the electrochemically active species take place. The performance of the cathode is affected to an appreciable extent by its morphology, the necessary gas permeability being ensured by a correspondingly high porosity of, for example, more than 60 percent during the operation of the cell.

However, the gas permeability through the cathode and the electrochemical reactions at the cathode surface is inadequate for higher cell outputs, so that the electrode must be activated catalytically. One possibility for activating the cathode consists of coating the surface of the cathode with transition metal oxides such as cerium oxide, titanium oxide or zirconium oxide, the particles generally being finely dispersed at the surface. The particle size of the activating species must be small enough to achieve an adequately high surface area.

It is a problem that the cathodes, in the unoxidized state, that is, when they consist essentially of nickel, must be coated with the catalytically activating particles, since the oxidation of the nickel to nickel oxide takes place during the operation of the fuel cell, that is, after the incorporation of the components in the fuel cell. However, since the oxidation of nickel to nickel oxide is associated with a drastic increase in volume, the bulk of the particles are overgrown by nickel oxide, so that these particles no longer are available for the catalytic activation.

U.S. Pat. No. 4,430,391 is concerned with cathodes for fuel cells. Their catalytic activity is increased by a selective change in the microstructure of the cathode material, so that locally disordered regions, which are not in equilibrium, are formed. This is, however, very cumbersome.

According to DE 42 35 514 C2, the nickel of the cathode of a molten carbonate fuel cell is protected by an electrochemically active of a double oxide before leaching by the molten carbonate electrolytes. The coating contains, for example, nickel, iron, cobalt or titanium. To produce the coating, a porous, pre-sintered nickel oxide matrix, with the help of a conventional coating method, is provided with an essentially non-oxide layer of the double oxide, which is to be formed, and then converted by heating under oxygen or by the cell operation into the double oxide form. It is furthermore described that the electrode is incorporated into the cell with a metal layer or metal hydroxide layer. In one example, a cathode is used, which is not oxidized and is impregnated with cobalt nitrate.

DE 689 01 782 T2 discloses that the electrode for a molten carbonate fuel cell may be impregnated with a compound, which is converted by a heat treatment into a ceramic material. The starting material is an oxide, carbide, nitride, boride or nitrate, which contains, for example, aluminum or zirconium. The heat treatment or oxidation evidently takes place before the oxidation of the nickel material of the cathode.

It is an object of the present invention to provide a method for the preparation of a fuel cell, as well as a fuel cell of the above-mentioned type, which has a better catalytic activity.

The objective is accomplished by a method for preparing a cathode for a molten carbonate fuel cell, wherein the fuel cell comprises a cathode of porous nickel oxide, which is coated with catalytically activating particles, an anode of porous nickel, and a melt of at least one alkali metal carbonate as electrolyte, which is disposed between the cathode and the anode and taken up in a finely porous electrolyte matrix. The method comprises (a) providing a sintered electrode web of porous nickel, which is converted to nickel oxide during operation of the fuel cell, (b) coating the electrode web with particles of at least one non-oxide inorganic metal compound, before the electrode web is incorporated in the fuel cell, and (c) incorporating the electrode web to the fuel cell whereby during operation of the fuel cell the non-oxide inorganic metal compound is converted in situ to a corresponding catalytically activating metal oxide with generation of a gas substantially simultaneously with the formation of the nickel oxide of the sintered web. The objective of the present inventions is also accompolished by a fuel cell so produced, and specifically, by a fuel cell with a cathode of porous nickel oxide, an anode of porous nickel and a melt of one or more alkali metal carbonates as electrolyte, which is disposed between the cathode and the anode and taken up in a finely porous electrolyte matrix, the cathode layer, on its surface facing the electrolyte matrix, being coated with catalytically activating particles, wherein essentially all catalytically activating particles are exposed on the surface. Pursuant to the invention, the electrode web is coated with catalytically activating particles of one or more inorganic metal compounds, which are not oxides and which are converted during the operation of the fuel cell to the corresponding metal oxides with evolution of gas.

The use of such particles of inorganic metal compounds, which, like the cathode, are converted to the corresponding oxides and release gas only during the operation of the fuel cell, has the advantage that the resulting metal oxides on the cathode surface cannot be overgrown by the nickel oxide formed and subsequently are exposed. The gas, escaping in small bubbles, forces the nickel oxide, which is formed, back around the metal oxide particle, so that, in addition, fine pores are formed, in which the metal oxide particle is embedded and has at least one free surface. Accordingly, all or at least the bulk of the metal oxide particles is available for activating the cathode reaction.

Further advantages of the invention are described in the dependent claims.

Preferably, inorganic metal compounds are used which, during the reaction to the corresponding metal oxides, release nitrogen and/or carbon dioxide as gas. They include, in particular, metal carbides, metal nitrides and metal carbonitrides.

Suitable metals are, for example, titanium, zirconium, cerium, iron, cobalt, aluminum and nickel, the use of titanium, zirconium and cerium being preferred. Preferably, titanium nitride, titanium carbide, titanium carbonitride, zirconium nitride, zirconium carbide, cerium carbide and cerium nitride are used, all or which are commercially obtainable. In principle, the activation can also be attained with other metal carbides, nitrides or carbonitrides, since the generation of gas and the formation of pores can also be obtained with them. It is only important that the resulting metal oxides are stable when in contact with the alkali metal carbonate melt and cannot contribute to the poisoning of the electrolyte.

Preferably, between 0.001% by weight and 0.5% by weight of non-oxide metal carbides and/or non-oxides metal nitrides and/or non-oxides metal carbonitrides, based on the weight of the electrode web, are used. Small particles are used in order to achieve the largest possible metal oxide surface and, with that, a satisfactory activation of the cathode reaction.

The cathodes can be produced by conventional manufacturing processes (such as dry doctoring or tape casting), which are known to those skilled in the art and are also described in the documents named above, which outline the state of the art. Since the non-oxide, inorganic metal compounds, at least the carbides and nitrides, are stable in the sintering atmosphere and are decomposed only at high oxygen partial pressures when the fuel cell is in operation, it is possible to coat the electrode web before the sintering with the catalytically activating particles.

Figure 2:
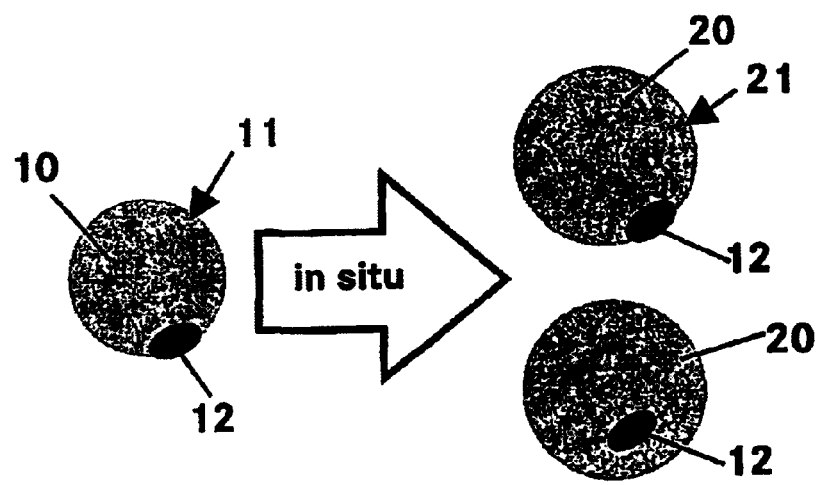
Figure 3:

In the following, the invention is explained in even greater detail by means of the attached drawings, in which FIG. 1 diagrammatically shows the construction of the active components of a fuel cell, FIG. 2 diagrammatically shows the position of the metal particles in a nickel oxide cathode, which is produced by a conventional method and FIG. 3 diagrammatically shows the position of the metal oxide particles of a nickel oxide cathode, which is produced according to the inventive method.

In FIG. 1, the electrochemically active components of a fuel cell are shown diagrammatically, namely the anode 1, the electrolyte matrix 2 and the cathode 3. The electrolyte matrix may, for example, be an LiAlO$_2$ matrix, filled with lithium-containing carbonates.

The cathode is produced by conventional methods, such as the so-called "tape casting" or "dry doctoring" method. In general, a slurry of nickel powder of a particular particle size and various auxiliary materials is produced, drawn out to an electrode web or sheet and dried. The electrode web is formed into a serviceable electrode material, in that it is heated, freed from organic components and sintered. The resulting, sintered porous nickel web is incorporated in fuel cells. The fuel cell is heated to its operating temperature, a cathode layer of nickel oxide being formed due to the action of the molten electrolyte.

The particles of activating materials are applied on the electrode web before the incorporation in the fuel cell. In conventional methods, these particles are metal oxides. In FIG. 2, it is shown diagrammatically what subsequently happens during the conversion of the nickel to nickel oxide. A nickel particle 10, which carries a metal oxide particle 12 at its surface 11, is shown at the left. After the conversion to nickel oxide in situ, a nickel oxide grain 20 is obtained, which is clearly larger than the nickel grain 10. The bulk of the metal oxide particles 12 is enclosed all around by nickel oxide (FIG. 2 at the bottom right), so that they are no longer available for activation of the cathode reaction. Only a small portion of the metal oxide particles 12 remains at the surface 21 of the nickel oxide grain (FIG. 2, top right).

Pursuant to the invention, the electrode web is coated with non-oxide, inorganic metal compounds only before or after the sintering. During the reaction of nickel to nickel oxide in situ, metal carbides, for example (such as titanium carbide (TiC)), is converted to metal oxides (in the case of titanium carbide, to titanium dioxide) in the following manner:

$$MC + 2O_2 \rightarrow MO_2 + CO_2 \qquad (I)$$

for example, $$TiC + 2O_2 \rightarrow TiO_2 + CO_2$$

Metal nitrides (such as titanium nitride) are converted, as follows, to metal oxides (in the case of titanium nitride to titanium dioxide):

$$MN + O_2 \rightarrow MO_2 + 0.5N_2 \qquad (II)$$

for example, $$TiN + O_2 \rightarrow TiO_2 + 0.5N_2$$

The carbon dioxide or nitrogen released tears open the nickel oxide and locally forms new surfaces, the metal oxide being exposed. This is shown diagrammatically in FIG. 3. At the left, a nickel grain 10 is shown once again. At its surface 11, it carries a particle 13 of a non-oxide, inorganic metal compound. At the right, it is seen that, after the reaction to nickel oxide in situ, the resulting nickel oxide grain 20 has, aside from its regular surface 21, new additional surfaces 22, 23. The metal oxide particle 12, which is also formed in situ, is partially exposed.

What is claimed is:

1. A method for preparing a cathode for a molten carbonate fuel cell, wherein the fuel cell comprises:
   (1) a cathode of porous nickel oxide, which is coated with catalytically activating particles,
   (2) an anode of porous nickel, and
   (3) a melt of at least one alkali metal carbonate as electrolyte, which is disposed between the cathode and the anode and taken up in a finely porous electrolyte matrix, the method for preparing the cathode comprising:
(a) providing a sintered electrode web of porous nickel to form the cathode, which is converted to nickel oxide during operation of the fuel cell, and
(b) coating the cathode with particles of at least one non-oxide inorganic metal compound, before the cathode is incorporated in the fuel cell, wherein the non-oxide inorganic metal compound is a metal carbonitride, wherein during operation of the fuel cell the non-oxide inorganic metal compound particles coated on the cathode are converted in situ to corresponding catalytically activating metal oxide particles with generation of a gas by the particles on the cathode simultaneously with the formation of the nickel oxide of the cathode, and wherein the gas provides tears in a surface of the nickel oxide of the cathode such that at least a portion of each of the particles is exposed from the surface of the nickel oxide through a respective tear.

2. A method of claim 1, wherein between about 0.001% by weight and about 0.5% by weight of non-oxide metal compound is used based on the weight of the electrode web.

3. A method of claim 1, wherein the cathode is coated with the catalytically activating particles prior to being sintered.

4. A method of claim 3, wherein the cathode web is sintered in a reducing atmosphere.

5. A cathode for a fuel cell made by the method of claim 1.

6. A fuel cell comprising a cathode of claim 5.

* * * * *